US010861194B2

(12) United States Patent
Omori

(10) Patent No.: US 10,861,194 B2
(45) Date of Patent: Dec. 8, 2020

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Hirotaka Omori, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 80 days.

(21) Appl. No.: 16/159,363

(22) Filed: Oct. 12, 2018

(65) Prior Publication Data

US 2019/0114806 A1 Apr. 18, 2019

(30) Foreign Application Priority Data

Oct. 17, 2017 (JP) .................................. 2017-201144

(51) Int. Cl.
*G06T 7/90* (2017.01)
*H04N 5/341* (2011.01)
*H04N 5/232* (2006.01)
*H04N 9/04* (2006.01)
*H04N 5/357* (2011.01)
*H04N 5/217* (2011.01)
*H04N 7/18* (2006.01)

(52) U.S. Cl.
CPC .............. *G06T 7/90* (2017.01); *H04N 5/217* (2013.01); *H04N 5/23238* (2013.01); *H04N 5/3415* (2013.01); *H04N 5/3572* (2013.01); *H04N 9/04517* (2018.08); *G06T 2207/10024* (2013.01); *G06T 2207/20172* (2013.01); *G09G 2320/066* (2013.01); *H04N 7/183* (2013.01)

(58) Field of Classification Search
CPC combination set(s) only.
See application file for complete search history.

(56) References Cited

U.S. PATENT DOCUMENTS

| | | | | |
|---|---|---|---|---|
| 2004/0240749 | A1* | 12/2004 | Miwa | G06T 7/12 382/274 |
| 2006/0017807 | A1 | 1/2006 | Lee | |
| 2006/0098253 | A1 | 5/2006 | Masuno | |
| 2010/0073523 | A1 | 3/2010 | Utsugi | |
| 2011/0090369 | A1* | 4/2011 | Yanagita | H04N 5/357 348/234 |
| 2014/0078247 | A1* | 3/2014 | Shohara | H04N 9/735 348/38 |
| 2016/0086050 | A1* | 3/2016 | Piekniewski | G06K 9/48 382/103 |

FOREIGN PATENT DOCUMENTS

| | | |
|---|---|---|
| JP | 2003-060983 A | 2/2003 |
| JP | 2011-211329 A | 10/2011 |

* cited by examiner

*Primary Examiner* — Omar S Ismail
(74) *Attorney, Agent, or Firm* — Canon U.S.A., Inc. IP Division

(57) ABSTRACT

A parameter obtaining circuit obtains a color saturation parameter which determines a degree of adjustment of color saturation of a captured image. A correction parameter calculation circuit calculates a color saturation level correction parameter which determines a degree of saturation level correction processing based on the color saturation parameter and a position of a pixel included in the captured image. A correction processing circuit performs the color saturation level correction processing on the captured image in accordance with the color saturation level correction parameter.

7 Claims, 13 Drawing Sheets

IMAGE PROCESSING APPARATUS, IMAGE PROCESSING METHOD, AND STORAGE MEDIUM

BACKGROUND OF THE INVENTION

Field of the Invention

The present disclosure relates to a technique of correcting color saturation of an image.

Description of the Related Art

In recent years, omnidirectional cameras (for example, cameras having a lens with horizontal and vertical angles of view of 180 degrees or more) capable of performing monitoring and imaging over a large range have been used. In such an omnidirectional camera, a portion of an outer edge of an image circle is included within the imaging range of an imaging element. Therefore, an image output from the imaging element of the omnidirectional camera will have a boundary between a region of the image circle which receives light and a region which does not receive light.

Furthermore, in an image captured by a digital still camera, a digital video camera, or a monitoring camera, a color blur referred to as a "fringe" may be visually recognized. The fringe is a phenomenon in which a color blur is generated, which appears as if a contour portion is fringed with blue or purple. This occurs where a contour having a large luminance difference is included in a captured image. The fringe is particularly easily generated in a case of an image having a boundary between a region of an image circle which receives light and a region of the image circle which does not receive light, such as an image captured by an omnidirectional camera as described above. That is, at a boundary where color changes abruptly and luminance value is large.

The generation of a fringe is caused by an imaging sensor, a lens, an operation of image processing, and the like, and various methods for solving the problem have been proposed in general. For example, Japanese Patent Laid-Open No. 2003-60983 discloses a method for measuring characteristics of a lens in advance, storing correction data in a memory, and executing a correction processing using the correction data at a time of imaging. Furthermore, Japanese Patent Laid-Open No. 2011-211329 discloses a method for performing imaging a plurality of times so as to obtain different images under different imaging conditions and combining the images so as to correct for a fringe.

However, in the method for measuring characteristics of a lens and storing correction data for a color blur in a memory as disclosed in Japanese Patent Laid-Open No. 2003-60983, memory capacity requirement of the apparatus is increased and the number of processes for adjustment is increased, and therefore, the configuration of the apparatus becomes complicated and it is difficult to accurately correct all adverse effects of the lens. Furthermore, in the technique disclosed in Japanese Patent Laid-Open No. 2011-211329, although correction data for a color blur is not required to be stored in advance, the imaging is required to be performed at least twice, and therefore, the amount of processing is increased. Therefore, to date, the solution to fringe has resulted in increased memory requirements and/or increased processing requirements.

SUMMARY OF THE INVENTION

According to an aspect of the present disclosure, an image processing apparatus includes an obtaining unit configured to obtain a color saturation parameter which determines a degree of adjustment of color saturation of a captured image, a calculation unit configured to calculate a color saturation level correction parameter which determines a degree of saturation level correction processing based on the color saturation parameter and a position of a pixel included in the captured image, and a processing unit configured to perform the color saturation level correction processing on the captured image in accordance with the color saturation level correction parameter. At least a portion of an outer edge of an image circle is included in an inside of an imaging range of an imaging element in the captured image. The calculation unit is arranged to calculate the color saturation level correction parameter which is usable to reduce the degree of the color saturation level correction processing as the position of the pixel is separated from the center of the imaging plane of the imaging element, on a region which receives light to the imaging element.

Further features of the present invention will become apparent from the following description of exemplary embodiments with reference to the attached drawings. Each of the embodiments of the present invention described below can be implemented solely or as a combination of a plurality of the embodiments. Also, features from different embodiments can be combined where necessary or where the combination of elements or features from individual embodiments in a single embodiment is beneficial.

DESCRIPTION OF THE EMBODIMENTS

Hereinafter, a preferred embodiment of the present disclosure will be described in detail with reference to the accompanying drawings.

Figure 1:
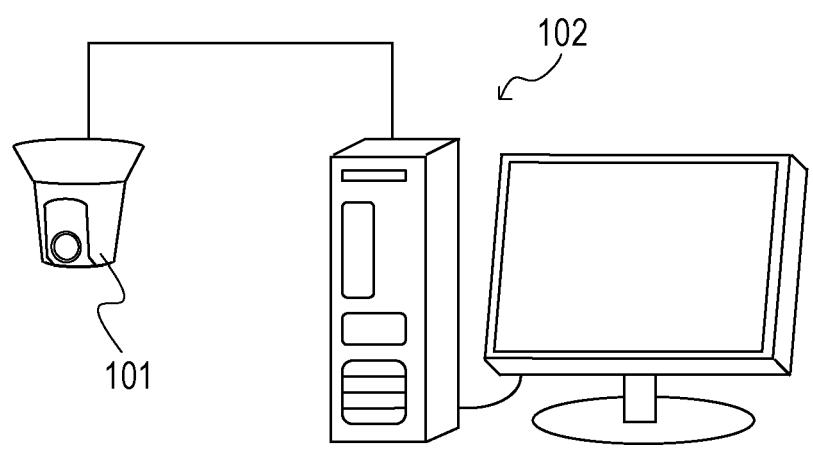
FIG. 1 is a diagram schematically illustrating an example of a configuration of an imaging system according to an embodiment.

FIG. 1 is a diagram schematically illustrating an example of a configuration of an imaging system according to this embodiment.

The imaging system illustrated in FIG. 1 includes a monitoring camera 101 serving as an image processing apparatus which performs shooting of moving images and image processing according to this embodiment and a client apparatus 102 connected to the monitoring camera 101 in a communication available manner through an IP network. The client apparatus 102 includes a personal computer and a display device, for example. Although a case where the monitoring camera 101 has functions of an image processing apparatus is described as an example in this embodiment, the image processing according to this embodiment may be performed by the client apparatus 102. Furthermore, it is assumed, in this embodiment, that the monitoring camera 101 is an omnidirectional camera (including a lens having horizontal and vertical angles of view of 180 degrees or more) capable of performing monitoring and imaging while overviewing a large range. Although the system including the monitoring camera 101 and the client apparatus 102 is described in this embodiment as an example, the system may include an omnidirectional digital still camera, a video camera, or a smartphone which is held by a user at a time of imaging. Furthermore, an angle of view of a lens may not be 180 degrees or more. If a boundary between a region of an image circle which receives light and a region of the image circle which does not receive light is included in an image output from the imaging element, the system at least includes a wide-angle lens corresponding to an angle smaller than 180 degrees.

Figure 2:
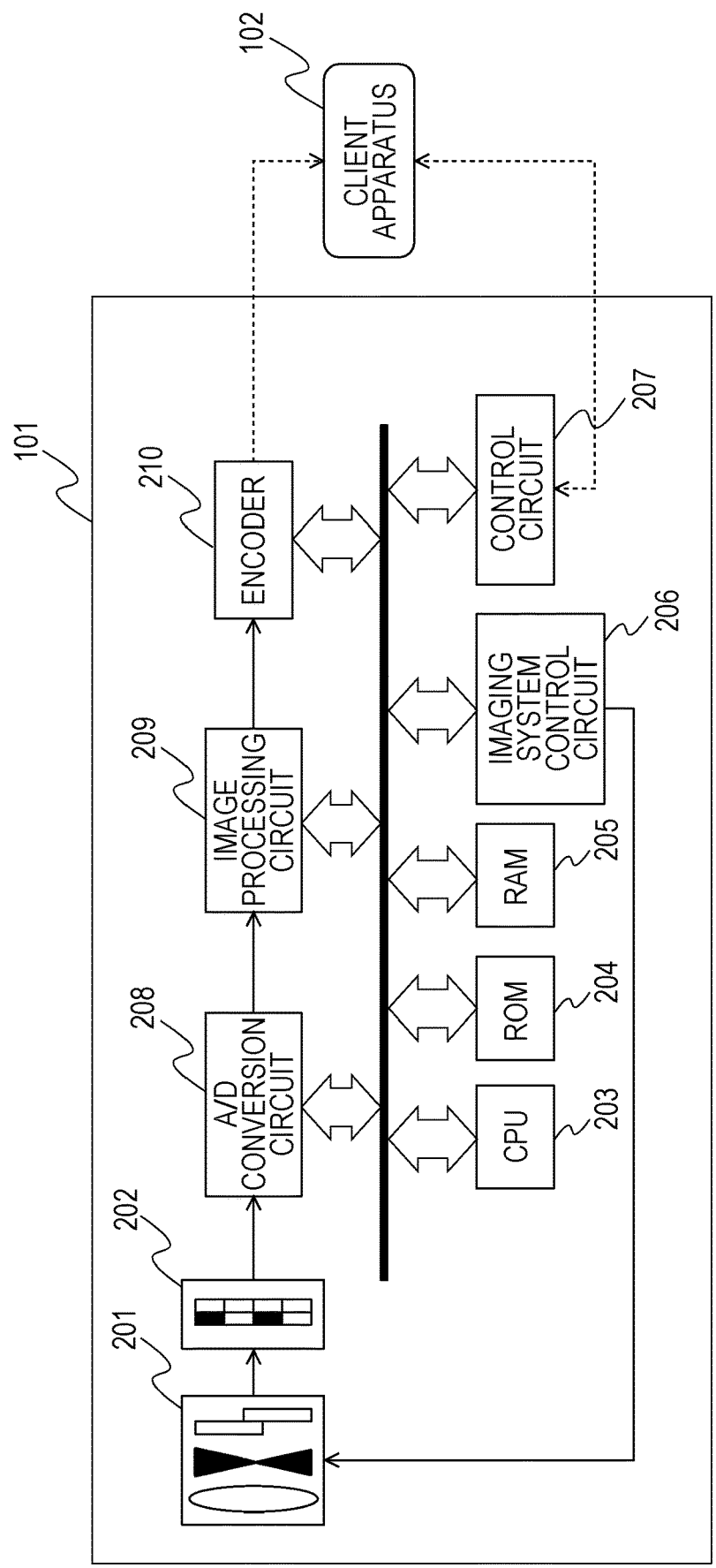
FIG. 2 is a diagram schematically illustrating an example of an internal configuration of an imaging apparatus according to the embodiment.

FIG. 2 is a diagram schematically illustrating an example of an internal configuration of the monitoring camera 101 according to this embodiment.

An imaging optical system 201 including a zoom lens, a focus lens, a blur correction lens, a diaphragm, and a shutter collects light emitted from an object or the like and forms an optical image of the object or the like on an imaging plane (a sensor plane) of an imaging element of an imaging sensor 202. In this embodiment, the imaging optical system 201 has a lens having horizontal and vertical angles of view of 180 degrees or more. The imaging sensor 202 includes the imaging element which converts the optical image formed on the imaging plane by the imaging optical system 201 into a current value. The imaging sensor 202 also obtains color information of R, G, and B since color filters are provided on the imaging plane of the imaging element. Furthermore, the imaging sensor 202 is capable of setting an arbitrary exposure time on all pixels of the imaging element.

A central processing unit (CPU) 203 performs processes and entire control of various components. The CPU 203 successively reads and interprets instructions stored in a read only memory (ROM) 204 or a random access memory (RAM) 205, and performs various processes and control in accordance with a result of the interpretation. An imaging system control circuit 206 performs, on the imaging optical system 201, various imaging control including focusing control, shutter open/close control, and diaphragm adjustment control under control of the CPU 203. A control circuit 207 performs control in accordance with an instruction issued by the client apparatus 102. An analog/digital (A/D) conversion circuit 208 converts an imaging signal supplied from the imaging sensor 202 into image data of digital signals. An image processing circuit 209 performs image processing according to this embodiment on the image data supplied from the A/D conversion circuit 208, and a detailed description of the processing will be described hereinafter. An encoder 210 performs conversion processing (encoding processing) of converting image data obtained after the image processing performed by the image processing circuit 209 into a file format of so-called Motion Jpeg or H264. Image data subjected to the encoding processing performed by the encoder 210 is output to the client apparatus 102, for example.

Figure 3:
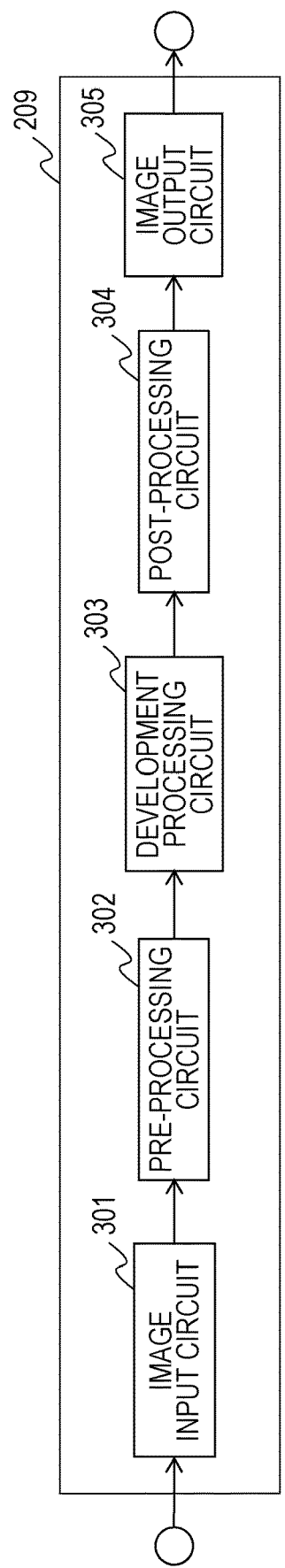
FIG. 3 is a block diagram illustrating an example of a configuration of an image processing circuit.

FIG. 3 is a block diagram schematically illustrating an example of an internal configuration of the image processing circuit 209 according to this embodiment. An image input circuit 301 obtains image data which has been obtained by the imaging sensor 202 described above and which has been subjected to the digital conversion performed by the A/D conversion circuit 208. A pre-processing circuit 302 performs removal of a fixed pattern noise caused by the imaging sensor 202 and correction processing, such as correction of aberration caused by the lens. A development processing circuit 303 performs development processing on the image data which has been subjected to the correction processing performed by the pre-processing circuit 302. A post-processing circuit 304 filters the image which has been subjected to the development processing performed by the development processing circuit 303 using an NR filter in a space direction and an NR filter in a time direction so as to perform a process of reducing noise which is randomly generated. An image output circuit 305 outputs the image data supplied from the post-processing circuit 304 to the encoder 210 of FIG. 1. Note that the pre-processing circuit 302, the post-processing circuit 304, and the image output circuit 305 are merely general examples of camera components and may not be required in the present disclosure.

Figure 4:
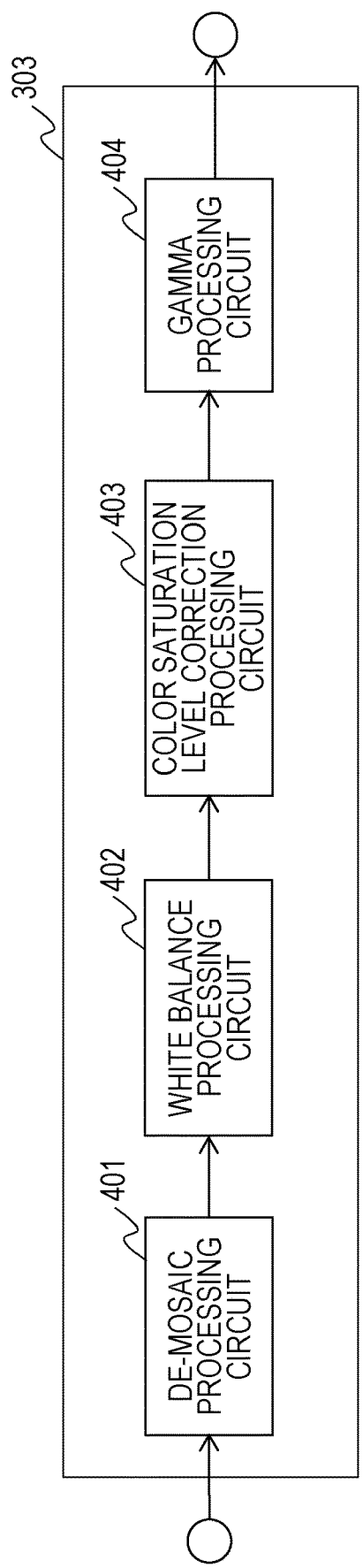
FIG. 4 is a block diagram illustrating an example of a configuration of a development processing circuit.

FIG. 4 is a block diagram illustrating an example of an internal configuration of the development processing circuit 303.

The development processing circuit 303 includes a de-mosaic processing circuit 401, a white balance processing circuit 402, a color saturation level correction processing circuit 403, and a gamma processing circuit 404. The de-mosaic processing circuit 401 performs de-mosaic processing on image data supplied from the pre-processing circuit 302. If the input image data has Bayer array, color saturations of individual pixels may not be calculated. Therefore, the color saturations of the individual pixels may be calculated by interpolating the individual pixels with all the color components by the de-mosaic processing. The white balance processing circuit 402 performs white balance processing on the image data which has been subjected to the de-mosaic processing. Although the color saturation level correction processing circuit 403 will be described in detail hereinafter, the color saturation level correction processing circuit 403 performs color saturation difference level correction processing so as to suppress a color blur. The gamma processing circuit 404 performs gamma processing on the image data supplied from the color saturation level correction processing circuit 403. Thereafter, the image data output from the gamma processing circuit 404 is supplied to the post-processing circuit 304 of FIG. 3.

Color Saturation Level Correction Processing

Hereinafter a configuration of the color saturation level correction processing circuit 403 and the color saturation level correction processing according to a first embodiment will be described. The color saturation level correction processing circuit 403 is a most significant feature in configurations of all embodiments, and the other circuits may be replaced with any apparatuses. For example, a process until the white balance processing is performed in an inside of the omnidirectional camera, and a tablet personal computer (PC) or an edge computer which includes the color saturation level correction processing circuit 403 receives an image which has been subjected to the white balance processing. In a case where image data processed by the color saturation level correction processing circuit 403 included in the tablet PC or the edge computer is transferred to a cloud, the tablet PC or the edge computer corresponds to the image processing apparatus of the present disclosure.

Figure 5:
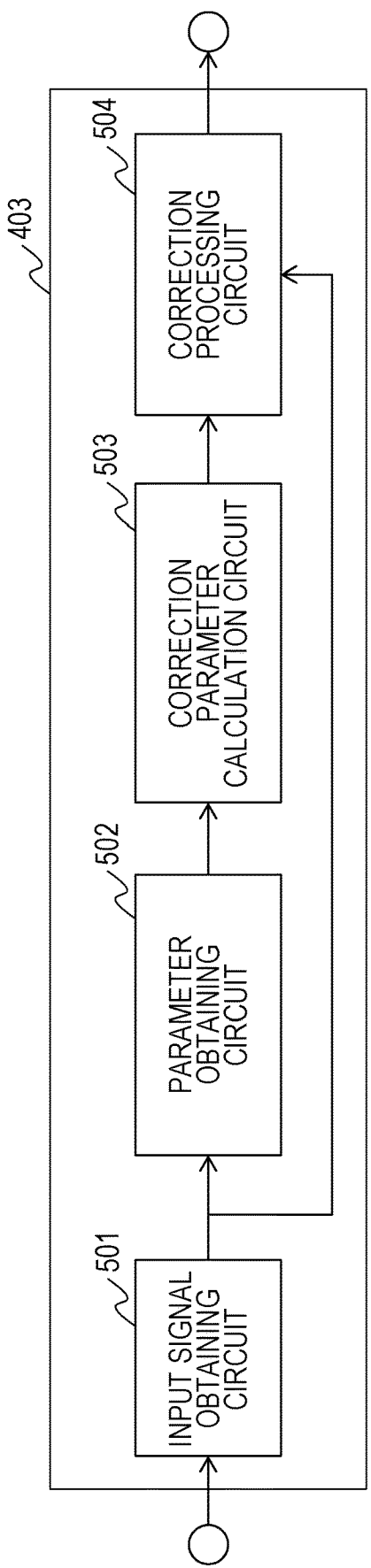
FIG. 5 is a block diagram illustrating an example of a configuration of a color saturation level correction processing circuit.

FIG. 5 is a diagram schematically illustrating an example of a configuration of the color saturation level correction processing circuit 403 according to the first embodiment. The color saturation level correction processing circuit 403 according to the first embodiment performs color saturation level correction on images in individual frames of a moving-image signal. The color saturation level correction processing circuit 403 includes an input signal obtaining circuit 501, a parameter obtaining circuit 502, a correction parameter calculation circuit 503, and a correction processing circuit 504.

Figure 6:
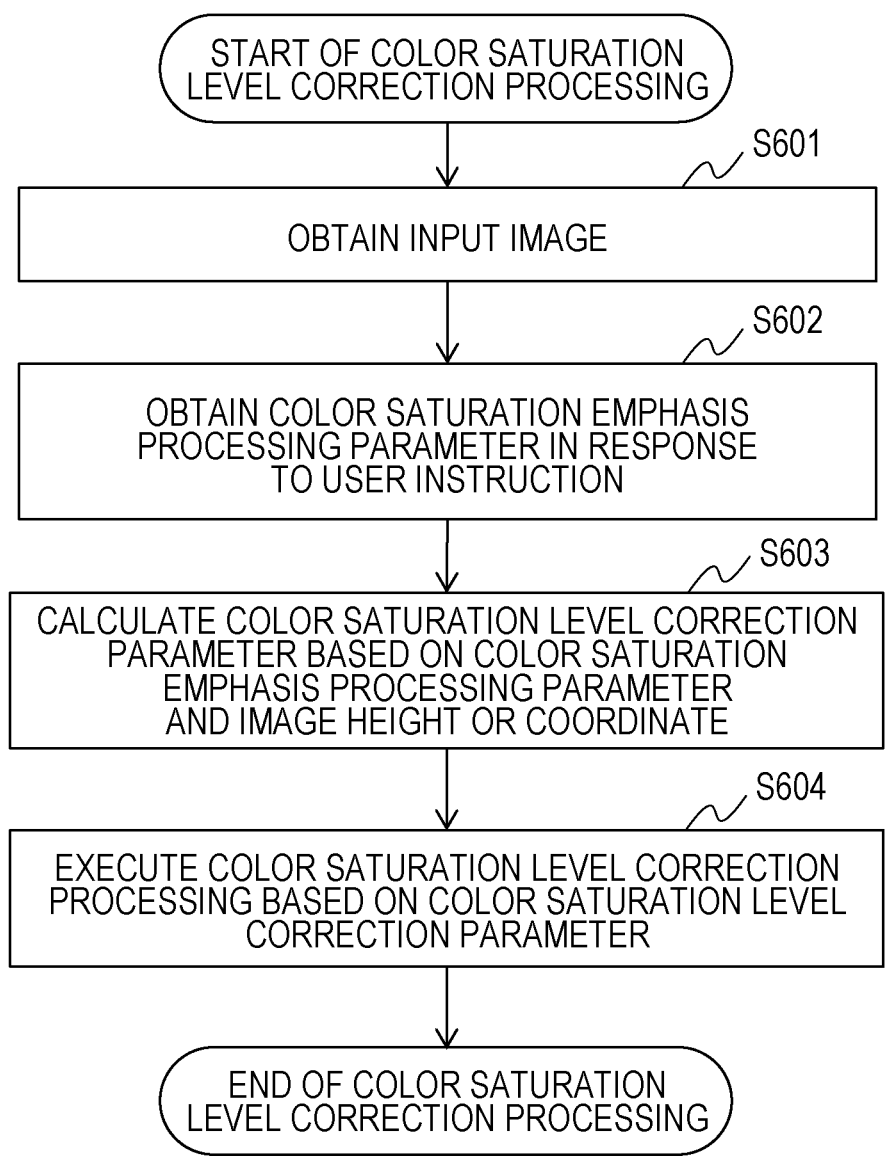
FIG. 6 is a flowchart of calculation of a color saturation level correction parameter according to a first embodiment.

FIG. 6 is a flowchart of the color saturation level correction processing executed by the color saturation level correction processing circuit 403 according to the first embodiment. Hereinafter, a flow of the color saturation level correction processing according to the first embodiment will be described with reference to the flowchart of FIG. 6. In a description below, processing steps S601 to S604 in the processing of the flowchart of FIG. 6 are simply referred to as S601 to S604. The processing in the flowchart of FIG. 6 may be executed by a hardware configuration or a portion of the processing may be realized by a software configuration and a remaining portion may be realized by a hardware configuration. When the processing is executed by a software configuration, the processing is realized when the CPU 203 or the like executes programs of the image processing according to this embodiment stored in the ROM 204, for example. The programs according to this embodiment may be provided in advance in the ROM 204, read from a detachable semiconductor memory or the like, or downloaded from a network, such as the Internet, not illustrated. These are true of other flowcharts described below.

In S601, the input signal obtaining circuit 501 obtains images (hereinafter referred to as "omnidirectional images") of frames in a moving-image signal captured by the monitoring camera 101 according to this embodiment which is an omnidirectional camera. The input signal obtaining circuit 501, such as a RAM, receives image data, temporarily stores the image data, and outputs the image data to the parameter obtaining circuit 502. The input signal obtaining circuit 501 may be replaced with an input terminal which externally receives image data.

In S602, the parameter obtaining circuit 502 obtains a color saturation parameter (hereinafter referred to as a "color saturation emphasis processing parameter") for determining a degree of emphasis of color saturation (color density) of an input image. For example, in a case of the monitoring camera, the user inputs an instruction through the client apparatus 102 so as to adjust a degree of emphasis of the color saturation. Hereinafter, a process of adjusting color saturation is referred to as "color saturation level correction processing". Specifically, an adjustment range of the color saturation level correction processing which may be selected by the user is in a range from 0 to 100, for example, and if the user specifies a degree corresponding to "50" of the color saturation level correction processing, the parameter obtaining circuit 502 obtains a value "50" as the color saturation emphasis processing parameter. Note that, the value "50" is a standard value as the color saturation emphasis processing parameter, and is the same as a color saturation level set in default when the user does not issue any designation. Note that, if an omnidirectional camera, such as a digital still camera or a video camera, is employed instead of the monitoring camera, the color saturation emphasis processing parameter may be obtained in accordance with an imaging mode which is set by the user or which is automatically set after scene is analyzed.

Subsequently, in S603, the correction parameter calculation circuit 503 calculates the color saturation level correction parameter based on the color saturation emphasis processing parameter and a position of a pixel in a captured image. A position of a pixel in the captured image is obtained as an image height indicating a distance from a center of the imaging plane of the captured image or a coordinate position when the color saturation level correction parameter is calculated. If a center of an image circle is reliably specified, a distance from the center of the image circle may be obtained as a position of a pixel. The color saturation level correction parameter is different from a correction parameter for correcting aberration based on the lens characteristics and is set independently from the parameter for correcting aberration. The color saturation level correction parameter according to this embodiment is not used to correct aberration but used to emphasize sharpness of an image, and therefore, lens characteristics other than information on an outer edge of the image circle are not taken into consideration. Thereafter, in S604, the correction processing circuit 504 executes the color saturation level correction processing in accordance with the color saturation level correction parameter calculated in S603 on the captured image obtained by the input signal obtaining circuit 501. Specifically, if image data includes color components of R, G, and B, the correction processing circuit 504 performs the color saturation level correction processing by correcting signal levels of R and B so that a difference between the signal level of R and a signal level of G and a difference between the signal levels of B and G are changed. Alternatively, the correction processing circuit 504 may perform the color saturation level correction processing by separating a luminance component and a color difference component from each other in image data and correcting a signal level of the color difference component so that an absolute value of the signal level of the color difference component is changed.

Hereinafter, the process of calculating the color saturation level correction parameter performed in S603 will be described in detail with reference to FIGS. 7 to 9 and Expressions (1) and (2) below.

Figure 7:
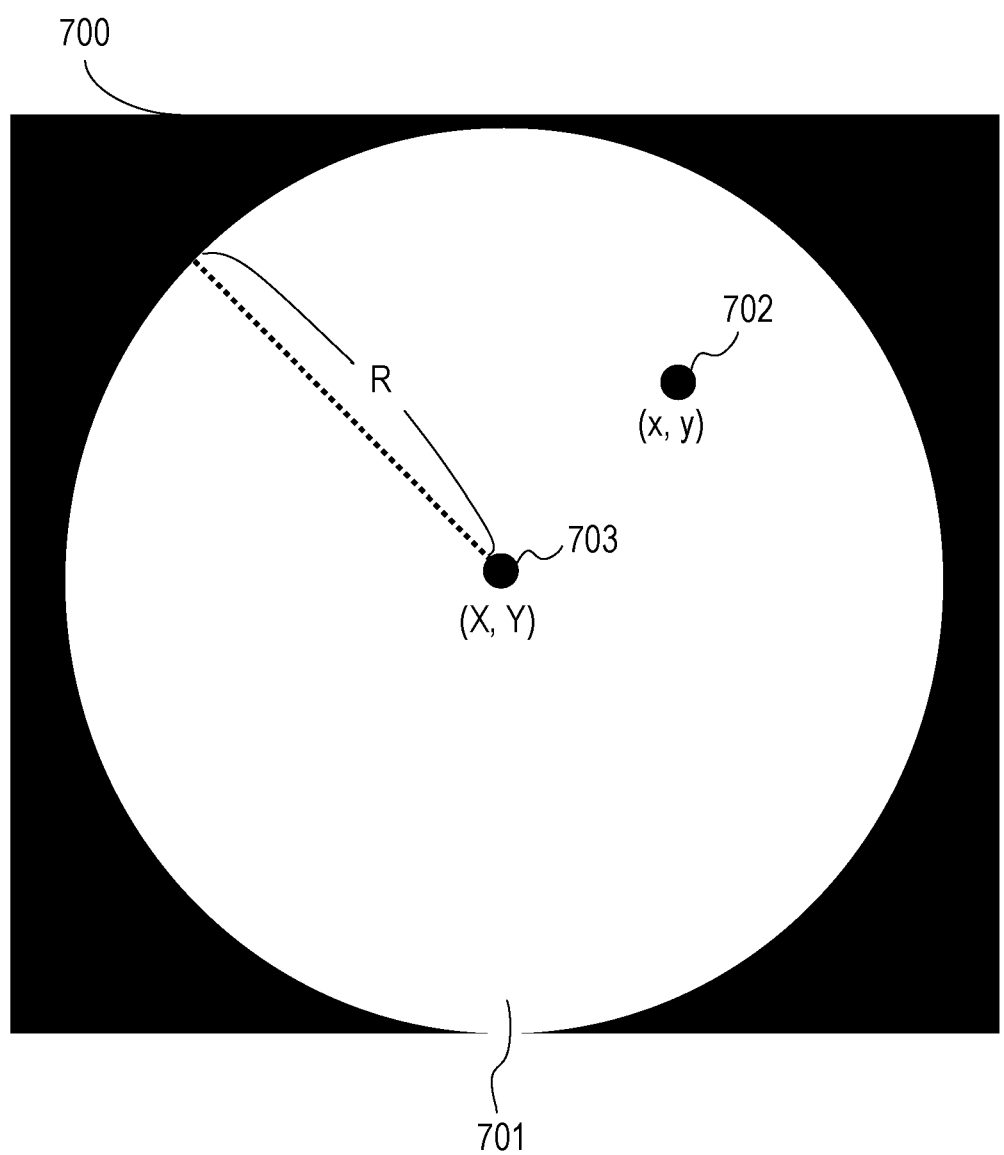
FIG. 7 is a diagram illustrating the relationship among an imaging element, an image circle, and a pixel to be subjected to color saturation level correction processing.

FIG. 7 is a diagram schematically illustrating an imaging range 700 of the imaging element included in the imaging sensor 202 and an image circle 701 formed by the imaging optical system 201. Here, a coordinate position of a target pixel 702 to be subjected to the color saturation level correction processing is denoted by (x, y), a coordinate position of a center of the imaging plane of the imaging element (hereinafter referred to as a screen center 703) is denoted by (X, Y), and a distance from a center of the image circle 701 to an outer edge is denoted by R. Note that the screen center 703 coincides with a center of the image circle 701, and positional information of the center of the image circle 701 (positional information of the screen center 703) and information on the distance R are provided in the monitoring camera 101 or the client apparatus 102 in advance. In a case where the monitoring camera 101 stores the positional information of the center of the image circle 701 and the information on the distance R, the information is transmitted from the monitoring camera 101 to the client apparatus 102. In this case, an image height index M(x, y) indicating a distance from the screen center 703 to the target pixel 702 is calculated in accordance with Expression (1) below.

$$M(x,y) = \{(X-x)^2 + (Y-y)^2\}/R^2 \quad \text{Expression (1)}$$

It is assumed that, in a case where an image height index M(x, y) is a value in a range from 0.0 to 1.0, for example, the target pixel 702 is included in the image circle 701. On the other hand, it is assumed that, in a case where the image height index M(x, y) is a value in a range larger than 1.0, for example, the target pixel 702 is out of the image circle 701.

Furthermore, a color saturation level correction parameter for the target pixel 702 in the coordinate position (x, y) is indicated as a correction parameter N(x, y). It is assumed here that the adjustment range of the color saturation level correction processing is in a range from 0 to 100 and the color saturation emphasis processing parameter obtained in S602 is 50. In this case, the correction parameter N(x, y) may be calculated in accordance with Expression (2) below using the image height index M(x, y) indicating a distance from the screen center 703 calculated in Expression (1)

$$N(x, y) = \begin{cases} 50 \times (1.0 - M(x, y)) & (\text{if } 0.0 \le M(x, y) \le 1.0) \\ 0.0 & (\text{otherwise}) \end{cases} \quad \text{Expression (2)}$$

Figure 8:
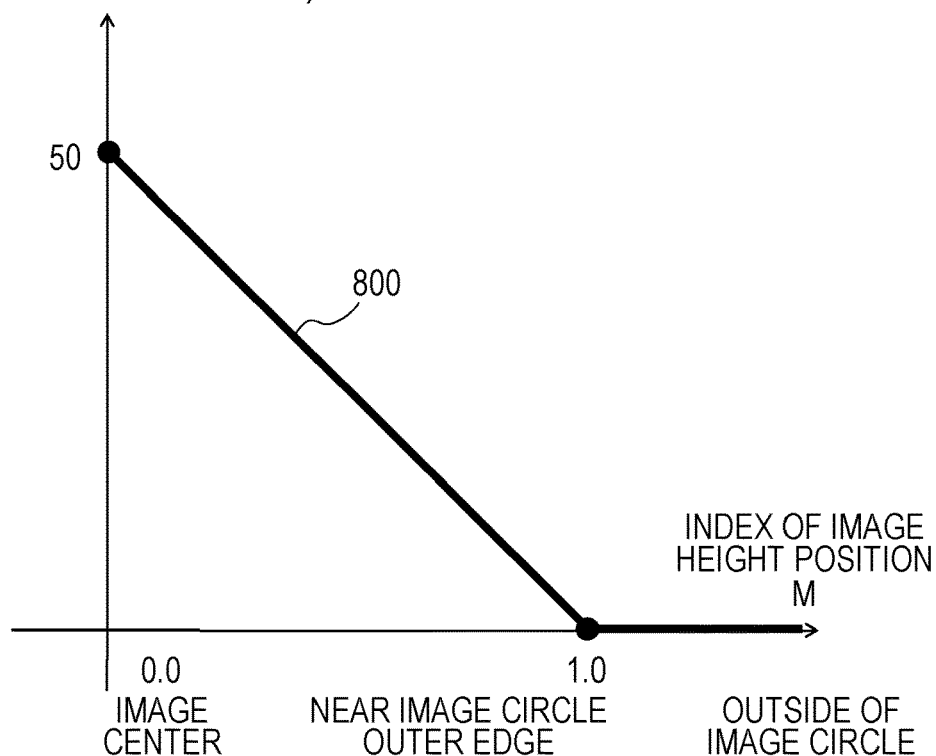
FIG. 8 is a graph of the relationship between the color saturation level correction parameter and an image height position.

FIG. 8 is a diagram illustrating an example of the relationship between the image height index M(x, y) represented by Expression (2) and the correction parameter N(x, y) which is denoted by a solid line 800. In FIG. 8, an axis of ordinates indicates the correction parameter N and an axis of abscissae indicates the image height index M. As denoted by the solid line 800 in FIG. 8, the correction parameter N(x, y) is set such that a color saturation level is reduced as a position is nearer to the outer edge of the image circle. It is highly likely that a monitoring target of the user is captured in the center portion of the image circle, and therefore, a degree of the color saturation level correction processing coincides with the color saturation emphasis processing parameter determined by the user. In the case of the example of FIG. 8, a value of the correction parameter N(x, y) is closer to 50 of the color saturation emphasis processing parameter as a position is nearer to the center portion of the image circle. Accordingly, in a case where the color saturation level correction processing using the correction parameter N(x, y) is executed in the correction processing circuit 504, the color saturation level is degraded as a position is nearer to the outer edge of the image circle. Therefore, a level of the color saturation is lowered when compared with a color saturation obtained before the color saturation level processing is performed in the outer edge, and color of the fringe is changed from blue or purple to achromatic color so that the color blur is suppressed (becomes insignificant). On the other hand, in FIG. 8, the correction parameter N(x, y) is set such that the color saturation level becomes 0 in S604 in the region which is located outside the image circle and which does not receive light (the region having the image height index M larger than 1.0). Alternatively, the correction processing circuit 504 may execute the color saturation level correction processing only on the region which receives light in the imaging element and may not execute the color saturation level correction processing on the region which does not receive light.

Figure 9:
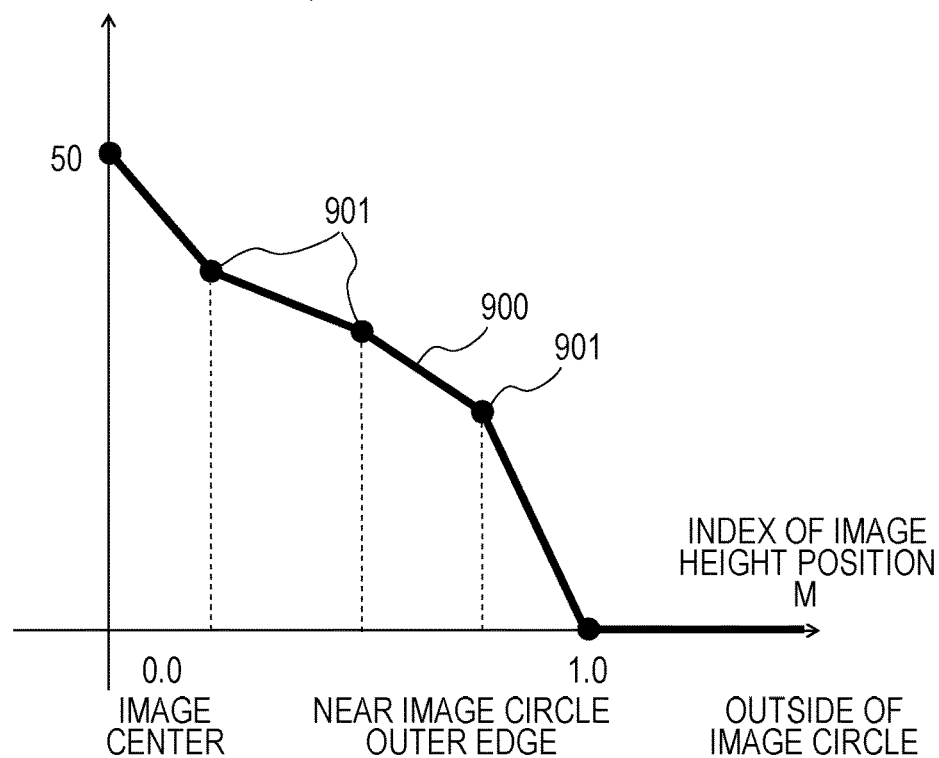
FIG. 9 is a graph illustrating a plurality of change points of the color saturation level correction parameter and the image height position.

Note that the correction parameter N is not limited to the value calculated in accordance with Expressions (1) and (2), and a method for smoothly calculating a change of the correction parameter N while a plurality of change points 901 are provided as denoted by a solid line 900 of FIG. 9 may be employed, for example. As with the case of FIG. 8, an axis of ordinates indicates the correction parameter N and an axis of abscissae indicates the image height index M in FIG. 9. Furthermore, the correction parameter N is not limited to the degree of the color saturation level correction processing and a correction parameter, such as gain relative to a color component, may be employed.

In the first embodiment, since the correction parameter N is set as described above, generation of the fringe in the outer edge of the image circle may be suppressed while color saturation desired by the user is realized in the center portion. Specifically, in the color saturation level correction processing circuit 403 according to this embodiment, the process from S601 to S604 in FIG. 6 described above may be performed on image data of a moving image, and therefore, generation of a color blur in an input image may be suppressed with a simple configuration and a small processing amount.

Although the color saturation level correction processing is executed in the monitoring camera 101 in the first embodiment, a target to be subjected to the color saturation level correction processing is not limited. The same process may be executed also in a case where a fisheye lens is used, a case where a wide-angle lens in which a portion of an outer edge of an image circle is included in an inside of an imaging range of an imaging element, or a case where vignetting is generated at four corners of an image.

Color Saturation Level Correction Processing of Second Embodiment

In the first embodiment described above, the method for calculating the color saturation level correction processing parameter in accordance with the color saturation emphasis processing parameter and a position (an image height or a coordinate) of a pixel which is executed by the correction parameter calculation circuit 503 is described in S603 of FIG. 6. In a second embodiment below, a correction parameter calculation circuit 503 calculates a color saturation level correction parameter taking information on color components into consideration in addition to a color saturation emphasis processing parameter and a position of a pixel. Note that a configuration associated with image processing in the second embodiment is the same as that of the first embodiment, and therefore, illustration and description thereof are omitted. Reference numerals the same as those of the first embodiment are assigned to components in the second embodiment which are the same as those of the first embodiment and descriptions thereof are omitted.

Figure 10:
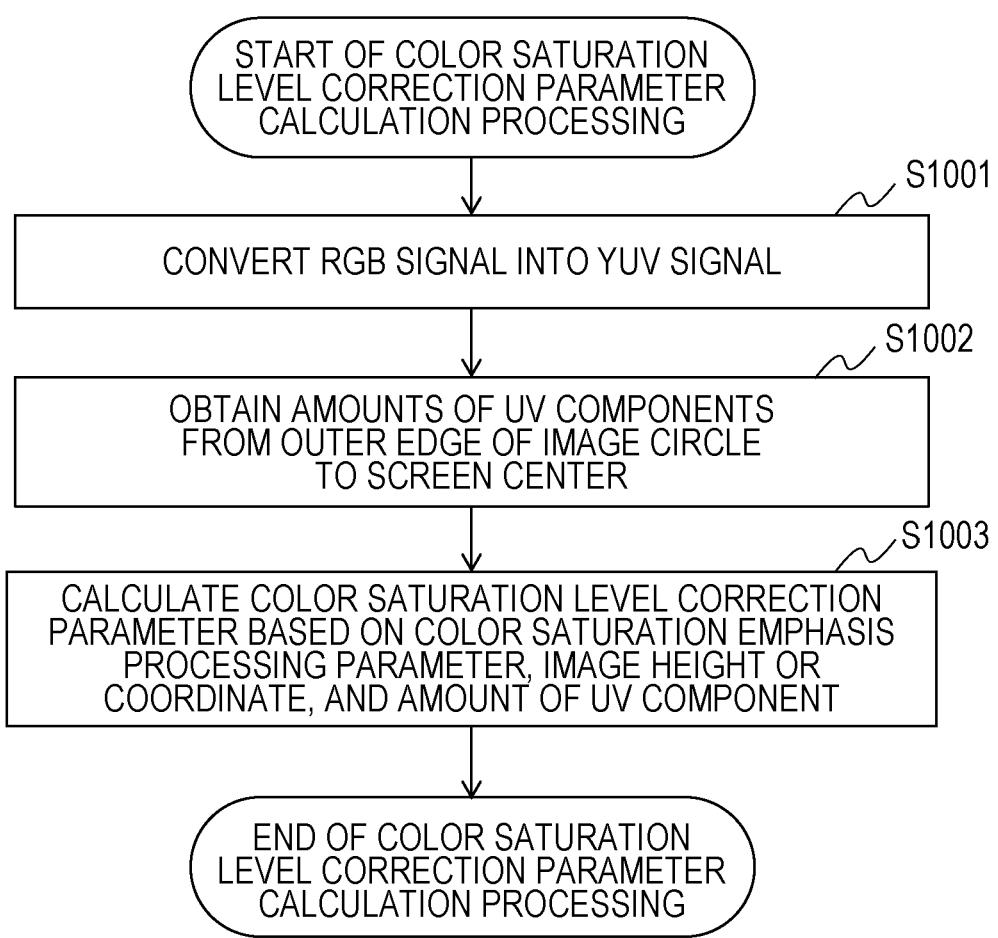
FIG. 10 is a flowchart of calculation of a color saturation level correction parameter according to a second embodiment.

FIG. 10 is a flowchart of parameter calculation processing in color saturation level correction processing performed by the correction parameter calculation circuit 503 according to the second embodiment. Hereinafter, a flow of the color saturation level correction processing according to the second embodiment will be described with reference to the flowchart of FIG. 10.

In S1001, the correction parameter calculation circuit 503 converts R, G, and B values of an input signal into a luminance (Y) component and color (UV) components as represented by Expression (3) below so as to obtain the color components.

$$Y(x,y)=0.299 \times R(x,y)+0.587 \times G(x,y)+0.114 \times B(x,y)$$

$$U(x,y)=-0.169 \times R(x,y)-0.331 \times G(x,y)+0.500 \times B(x,y)$$

$$V(x,y)=0.500 \times R(x,y)-0.419 \times G(x,y)-0.081 \times B(x,y) \quad \text{Expression (3)}$$

Here, R(x, y), G(x, y), and B(x, y) in Expression (3) denote signal levels of R, G, and B, respectively, in a coordinate position (x, y), and Y(x, y), U(x, y), and V(x, y) denote signal levels of Y, U, and V, respectively. Note that the color signals are not limited to values calculated in accordance with Expression (3), and a and b values obtained by Lab conversion or Cb and Cr values obtained by YCbCr conversion may be employed.

Subsequently, in S1002, the correction parameter calculation circuit 503 obtains values of the U and V components in individual image heights from an outer edge of an image circle to a screen center and normalize the obtained values into values in a range from 0.0 to 1.0. The values obtained by normalization of the values of the U and V components are referred to as "UV intensity O(x, y)".

Furthermore, in 51003, the correction parameter calculation circuit 503 calculates a correction parameter N(x, y) in accordance with Expression (4) using an image height index M(x, y) obtained in accordance with Expression (1) and a color saturation emphasis processing parameter L, and the UV intensity O(x, y) obtained in S1002.

$$N(x, y) = \begin{cases} L \times (1.0 - M(x, y)) \times \\ (1.0 - O(x, y)) \end{cases} \text{(if } 0.0 \le M(x, y) \le 1.0\text{)} \quad \text{Expression (4)}$$
$$\phantom{N(x, y) = } \{0.0 \quad \text{(otherwise)}$$

Figure 11A:
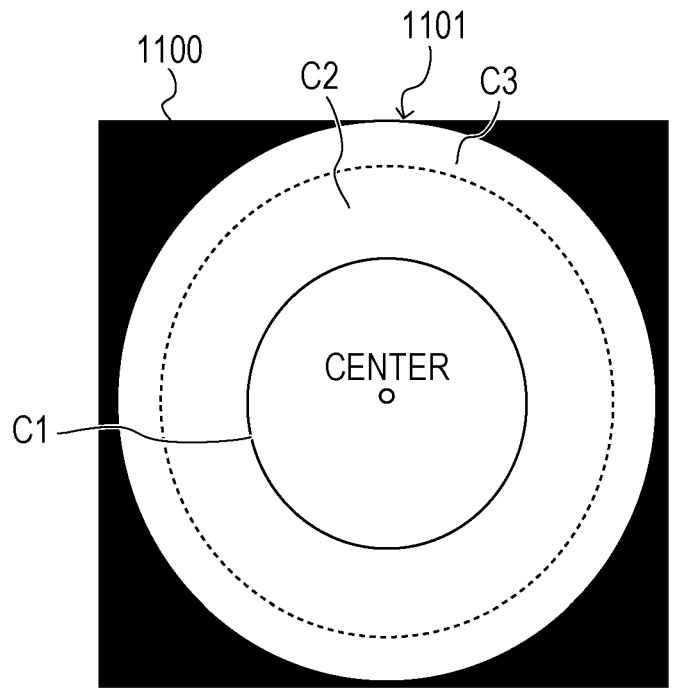
FIGS. 11A and 11B are diagrams illustrating color saturation level correction when color components are added according to the second embodiment.
Figure 11B:
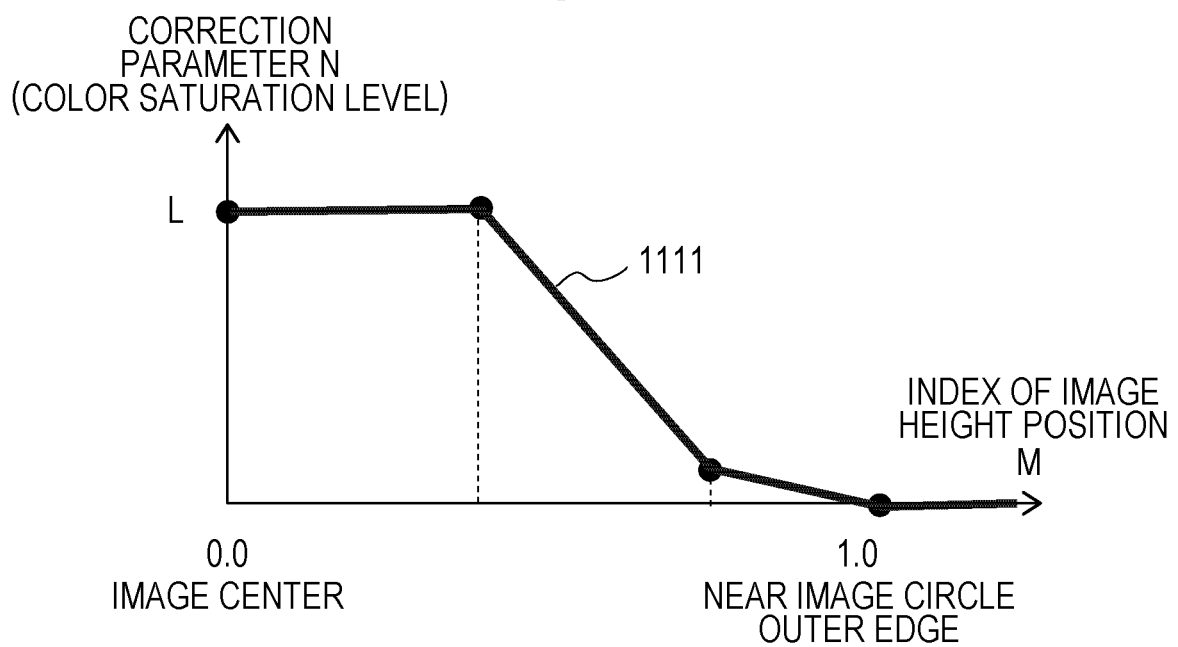

FIGS. 11A and 11B are diagrams illustrating the relationship among the UV intensity O, the image height index M, and the correction parameter N when the correction parameter N is calculated in accordance with Expression (4). FIG. 11A is a diagram illustrating an imaging range 1100 of the imaging element and an image circle 1101. It is assumed that, as illustrated in FIG. 11A, in the image circle 1101, a large number of objects having high U and V components are distributed in a region C1 including a screen center (a region of the large UV intensity O), and a large number of achromatic objects are distributed in a region C2 in an intermediate position (a region of the small UV intensity O). On the other hand, a comparatively large number of objects having high U and V components are distributed in a region C3 in an outer edge portion in the image circle 1101. FIG. 11B is a diagram illustrating an example of the relationship between the imaging height index M and the correction parameter N according to the second embodiment represented by a solid line 1111. As with the case of FIG. 8 described above, an axis of ordinates denotes the correction parameter N and an axis of abscissae denotes the image height index M.

As illustrated in FIGS. 11A and 11B, in a region including a large number of color components (large U and V components), such as the regions C1 and C3, change of the intensity of the color saturation level correction processing using the color saturation level correction parameter is moderate. For example, in the region C1 including a large number of U and V components (large UV intensity O) in the screen center, a change in color saturation is reduced by reducing a change of the color saturation level correction parameter. Furthermore, in the region C3 in which a comparatively large number of U and V components are distributed in the outer edge of the image circle, unevenness of color saturations is suppressed by reducing a change in the color saturation level correction parameter. On the other hand, in the region C2 which is an almost achromatic region in the intermediate position, a change in color saturation is increased by dramatically changing the color saturation level correction parameter.

In this way, according to the second embodiment, the color saturation level correction processing parameter is calculated taking the UV intensity O(x, y) into consideration so that a difference between color saturations in individual image heights may be moderated even in a case where the color saturation level correction processing is performed in different intensities in different image height positions.

Furthermore, the correction parameter N is not limited to the value obtained in accordance with Expression (4), and a method for calculating the correction parameter N in accordance with Expression (5) may be employed, for example.

$$N(x, y) = \quad \text{Expression (5)}$$
$$\begin{cases} L \times (1.0 - M(x, y)) \times O(x, y) & \text{(if } 0.0 \le M(x, y) \le 1.0\text{)} \\ 0.0 & \text{(otherwise)} \end{cases}$$

In a case where the color saturation level correction parameter is obtained in accordance with Expression (5), even when the color saturation level correction processing is executed on an object having a large color component in the outer edge of the image circle, color saturation desired by the user may be realized. Note that a method for calculating the color saturation level correction parameter by combining the methods using Expression (4) and Expression (5) with each other depending on an image height position may be employed.

As described above, according to the second embodiment, generation of a color blur in an outer edge of an image circle may be suppressed while a difference between color saturations in different image heights caused by the color saturation level correction processing is suppressed.

Color Saturation Level Correction Processing in Third Embodiment

In a third embodiment, a case where a correction parameter calculation circuit 503 calculates a color saturation level correction parameter taking a display mode into consideration in addition to a color saturation emphasis processing parameter and an image height or a coordinate of a pixel will be described as an example. Note that a configuration associated with image processing in the third embodiment is the same as that of the first embodiment, and therefore, illustration and description thereof are omitted. Reference numerals the same as those of the first embodiment are assigned to components in the third embodiment which are the same as those of the first embodiment and descriptions thereof are omitted.

Here, in an imaging system according to this embodiment, a user may arbitrarily set a display method for displaying an image in a display apparatus of a client apparatus 102. A display method is set when a user selects a desired display mode from among a plurality of display modes, for example. As a display mode, a mode for displaying a panoramic image by specifying an arbitrary region by the user in an image captured by an omnidirectional camera and performing distortion correction on an omnidirectional image having distortion (a panoramic mode) so that a panoramic image is displayed may be employed.

Figure 12:
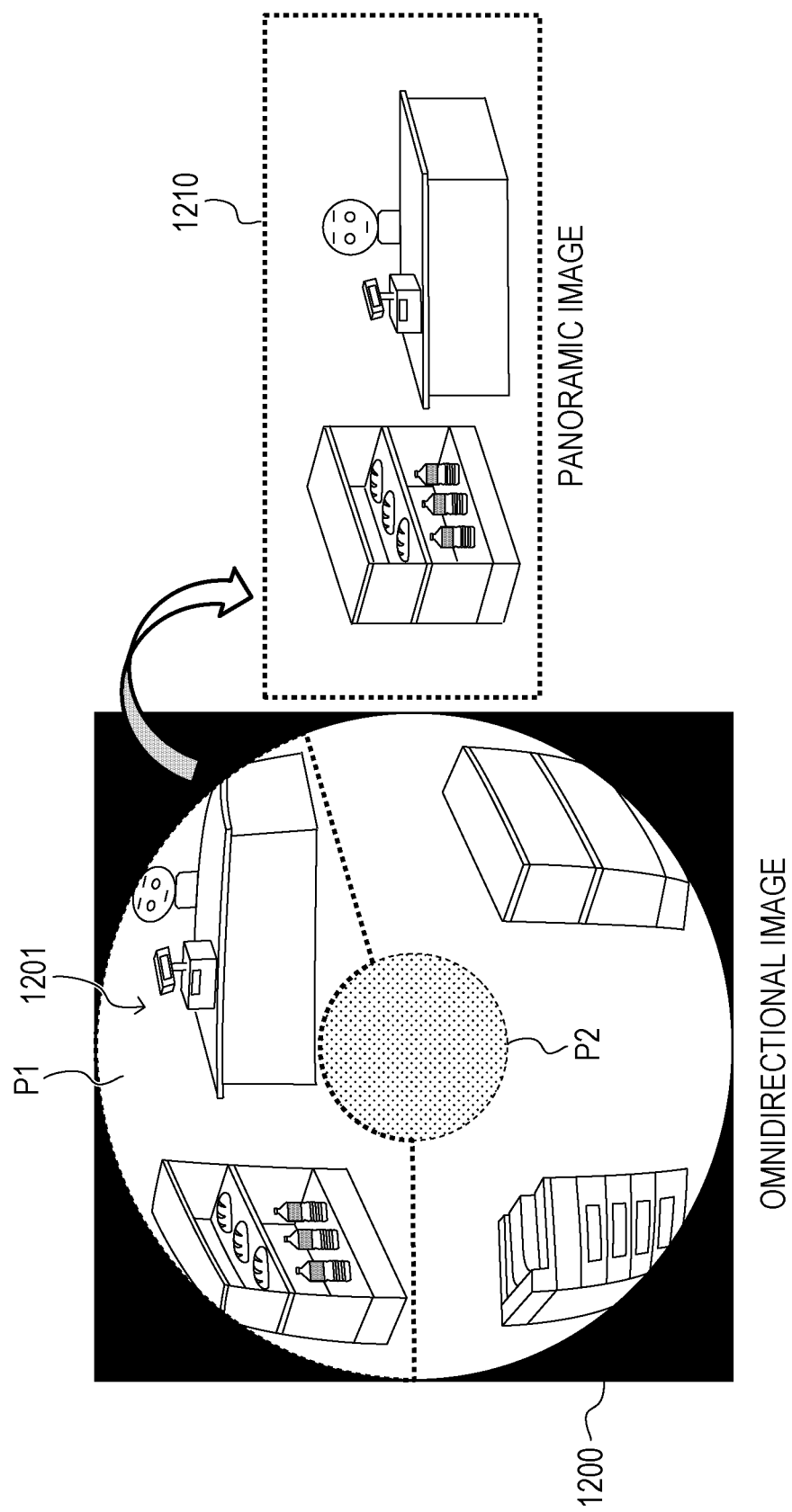
FIG. 12 is a diagram illustrating an example of generation of a panoramic image using an omnidirectional image.

FIG. 12 is a diagram illustrating an imaging range 1200 of an imaging element and an image circle 1201. An omnidirectional image of the image circle 1201 may be divided into a region P1 which is displayed in the panoramic mode and a region P2 which is not displayed in the panoramic mode. When display is performed in the panoramic mode, an image in the region P1 is extracted from the omnidirectional image in the image circle 1201 and distortion correction is performed on the image before a panoramic image 1210 is displayed. As illustrated in FIG. 12, in a case where the user desires to display the panoramic image, for example, the panoramic image 1210 is generated using the region P1 while a center portion of the omnidirectional image is excepted. Here, since a partial region of the image circle 1201 is not displayed in the panoramic mode as illustrated in FIG. 12, an effect of the color saturation level correction processing is not reflected on a certain region in an image monitored by the user, for example. Specifically, since the effect of the color saturation level correction processing is not reflected on a certain region depending on a display mode, a color saturation level correction parameter corresponding to a display mode is calculated in a correction parameter calculation processing according to the third embodiment.

Figure 13:
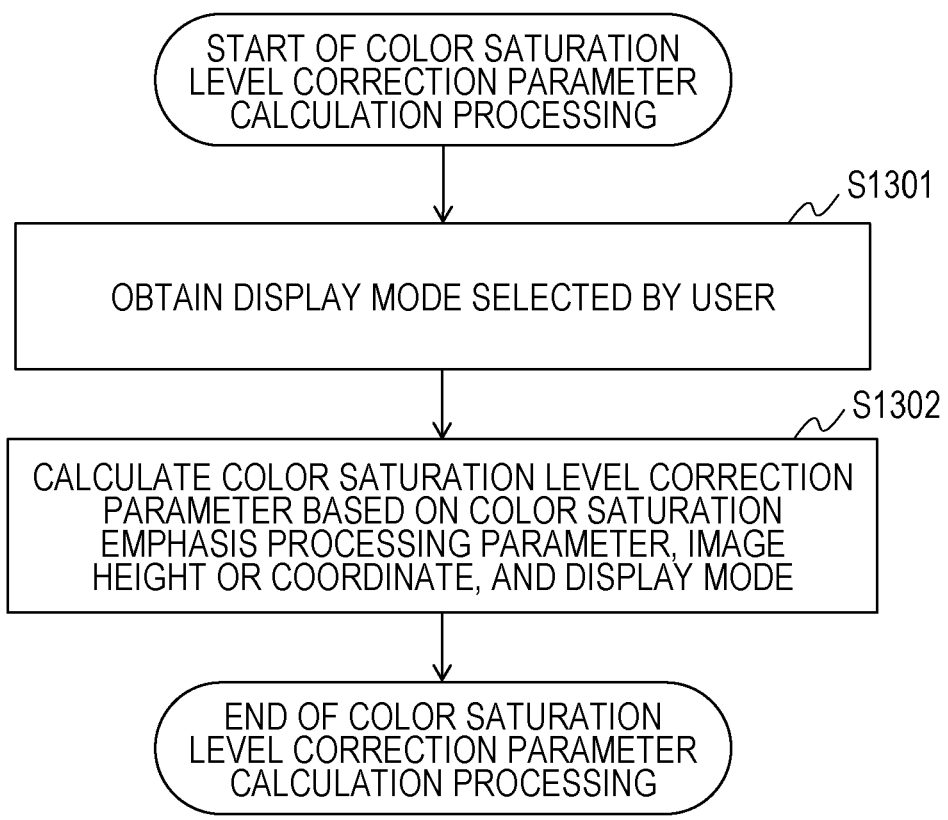
FIG. 13 is a flowchart of calculation of a color saturation level correction parameter according to a third embodiment.

FIG. 13 is a flowchart of calculation of a correction parameter according to the third embodiment. Hereinafter, a flow of the color saturation level correction processing according to the third embodiment will be described with reference to the flowchart of FIG. 13.

In S1301, a correction parameter calculation circuit 503 obtains a display mode selected by the user through a client apparatus 102, for example.

Subsequently, in S1302, the correction parameter calculation circuit 503 calculates a color saturation level correction parameter based on an image height index M(x, y) obtained in accordance with Expression (1), a color saturation emphasis processing parameter L, and the display mode obtained in S1301.

Figure 14A:
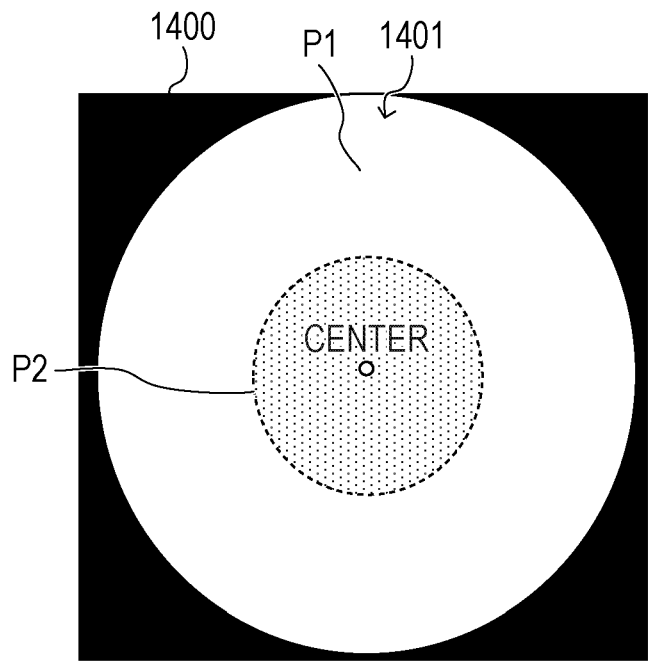
FIGS. 14A and 14B are diagrams illustrating color saturation level correction when a display mode is added according to the third embodiment.
Figure 14B:
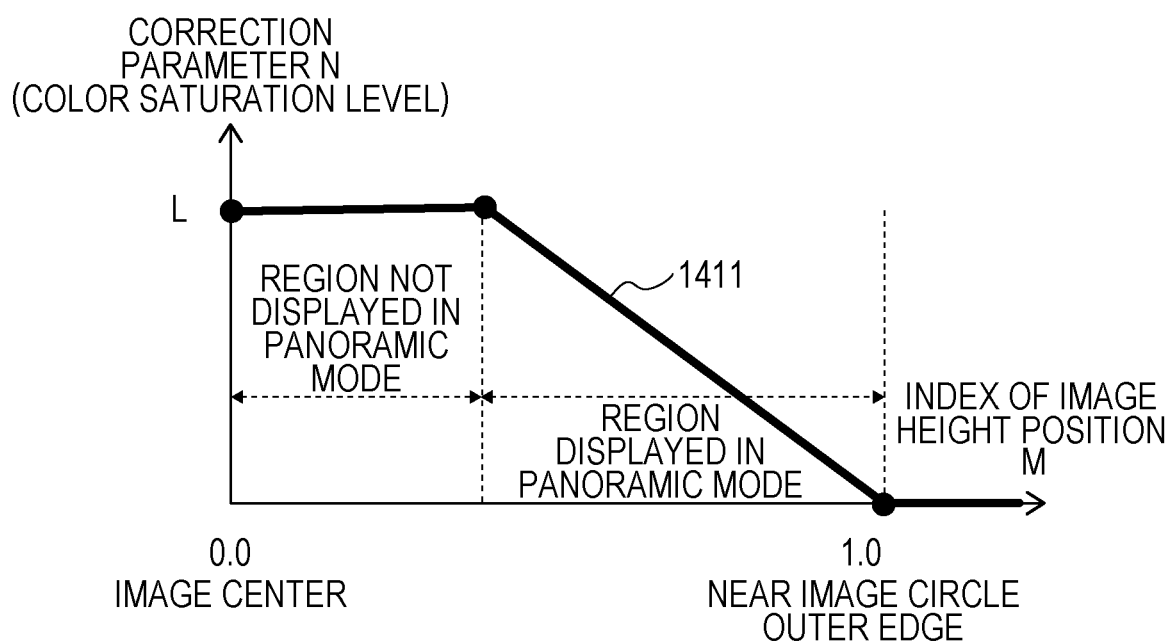

FIGS. 14A and 14B are diagrams illustrating the relationship between the image height index M and the color saturation level correction parameter (a correction parameter N) in a case where a panoramic mode is selected as a display mode according to the third embodiment. FIG. 14A is a diagram illustrating an imaging range 1400 of an imaging element and an image circle 1401. As illustrated in FIG. 14A, in the image circle 1401, a region P2 including a screen center is not displayed in the panoramic mode and the other region P1 is displayed in the panoramic mode. FIG. 14B is a diagram illustrating an example of the relationship between the imaging height index M and the correction parameter N according to the third embodiment represented by a solid line 1411. As with the case of FIG. 8 described above, an axis of ordinates denotes the correction parameter N and an axis of abscissae denotes the image height index M.

In the third embodiment, as illustrated in FIGS. 14A and 14B, a saturation level correction parameter which is equivalent to a value obtained by the color saturation emphasis processing parameter is set in the region P2 which is not displayed in the panoramic mode. Furthermore, in the image circle 1401, in the region P1 displayed in the panoramic mode which excepts the region P2, as with the case of FIG. 8 according to the first embodiment, the color saturation level correction parameter is set such that a degree of the color saturation level correction processing is gradually reduced in accordance with the image height index M.

As described above, according to the third embodiment, the color saturation level correction processing may be appropriately executed in accordance with a display mode selected by the user by calculating the color saturation level correction processing parameter suitable for the display mode.

Note that, although the case where the color saturation level correction processing parameter is calculated using information on a display mode in addition to the color saturation emphasis processing parameter and a position (an image height or a coordinate) of a pixel described in the first embodiment is described as an example in the third embodiment, the color saturation level correction processing parameter may be calculated additionally using information on color components described in the second embodiment.

As described above, according to the first to third embodiments, the color saturation level correction processing is appropriately performed on an image in which a portion of an outer edge of an image circle (an image forming range) is included in an imaging range of an imaging element so that generation of a color blur is suppressed. According to the first to third embodiments, the color saturation level correction processing for suppressing generation of a color blur in a captured image, particularly, generation of a fringe in an outer edge region of an image circle may be realized in a monitoring camera capable of capturing an omnidirectional image.

Other Embodiments

The image processing apparatus of this embodiment is not limited to a monitoring camera. The image processing apparatus of this embodiment is applicable to various mobile terminals including digital still cameras capable of capturing images in ranges of large angle of view, digital video cameras, and smartphones and tablet terminals having a camera function, and is further applicable to industrial cameras, in-vehicle cameras, medical cameras, and so on.

The present disclosure may be realized by a process of supplying a program which realizes at least one of the functions in the foregoing embodiments to a system or an apparatus through a network or a storage medium and reading and executing the program by at least one processor included in a computer of the system or the apparatus. Furthermore, the present disclosure may be realized by a circuit (application specific integrated circuit (ASIC)) which realizes at least one of the functions.

The foregoing embodiments are merely concrete examples for embodying the present disclosure, and the technical scope of the present disclosure is not limited by the embodiments. Specifically, the present disclosure may be embodied in various forms without departing from the scope and main features of the present disclosure.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments.

This application claims the benefit of Japanese Patent Application No. 2017-201144 filed Oct. 17, 2017, which is hereby incorporated by reference herein in its entirety.

What is claimed is:

1. An image processing apparatus comprising:
a processor; and
a memory including instructions that, when executed by the processor, cause the processor to:
obtain a color saturation parameter indicating a degree of adjustment of color saturation of a captured image captured by an omnidirectional camera, wherein at least a portion of an outer edge of an image circle is included in an inside of an imaging range of an imaging element in the captured image;
determine a color saturation level correction parameter indicating a degree of saturation level correction processing based on the color saturation parameter and a position in the captured image; and
perform the color saturation level correction processing on the captured image in accordance with the color saturation level correction parameter,
wherein the color saturation level correction parameter is set so that the degree of the color saturation level correction processing is reduced as the distance from the center of the imaging plane of the imaging element increases, on a region which receives light to the imaging element.

2. The image processing apparatus according to claim 1, wherein the color saturation level correction parameter has a plurality of change points.

3. The image processing apparatus according to claim 1, wherein the color saturation level correction processing is not executed in a region which does not receive light.

4. The image processing apparatus according to claim 1, wherein the color saturation level correction parameter is calculated based on the color saturation parameter, the position of the pixel, and an amount of color component in the captured image.

5. The image processing apparatus according to claim 1, wherein the color saturation level correction parameter is calculated based on the color saturation parameter, the position of the pixel, and information on a display method employed when the image is displayed.

6. An image processing method comprising:
obtaining a color saturation parameter indicating a degree of adjustment of color saturation of a captured image captured by an omnidirectional camera, wherein at least a portion of an outer edge of an image circle is included in an inside of an imaging range of an imaging element in the captured image;
determining a color saturation level correction parameter indicating a degree of saturation level correction processing based on the color saturation parameter and the position in the captured image; and
performing the color saturation level correction processing on the captured image in accordance with the color saturation level correction parameter,
wherein the color saturation level correction parameter is set so that the degree of the color saturation level correction processing is reduced as the distance is separated from the center of the imaging plane of the imaging element increases, on a region which receives light to the imaging element.

7. A nonvolatile storage medium that stores a program that causes a computer to execute an image processing method comprising:
obtaining a color saturation parameter indicating a degree of adjustment of color saturation of a captured image captured by an omnidirectional camera, wherein at least a portion of an outer edge of an image circle is included in an inside of an imaging range of an imaging element in the captured image;
determining a color saturation level correction parameter indicating a degree of saturation level correction processing based on the color saturation parameter and the position in the captured image; and
performing the color saturation level correction processing on the captured image in accordance with the color saturation level correction parameter,
wherein the color saturation level correction parameter is set so that the degree of the color saturation level correction processing is reduced as the distance is separated from the center of the imaging plane of the imaging element increases, on a region which receives light to the imaging element.

* * * * *